United States Patent [19]
Wang

[11] Patent Number: 5,950,158
[45] Date of Patent: Sep. 7, 1999

[54] METHODS AND APPARATUS FOR DECREASING THE SIZE OF PATTERN RECOGNITION MODELS BY PRUNING LOW-SCORING MODELS FROM GENERATED SETS OF MODELS

[75] Inventor: Kuansan Wang, Brewster, N.Y.

[73] Assignee: Nynex Science and Technology, Inc., New York, N.Y.

[21] Appl. No.: 08/903,532

[22] Filed: Jul. 30, 1997

[51] Int. Cl.⁶ ..................................................... G10L 5/00
[52] U.S. Cl. .......................... 704/244; 704/240; 704/256
[58] Field of Search ................................... 704/255, 256, 704/243, 244, 245, 203–206, 200

[56] References Cited

U.S. PATENT DOCUMENTS

| | | | |
|---|---|---|---|
| 4,783,804 | 11/1988 | Juang et al. | |
| 5,606,644 | 2/1997 | Chou et al. | |
| 5,677,988 | 10/1997 | Takami et al. | 704/256 |
| 5,765,125 | 6/1998 | Daugherty et al. | 704/205 |
| 5,799,277 | 8/1998 | Takami | 704/256 |

OTHER PUBLICATIONS

Y. Normandin, Optimal Splitting of HMM Gaussian Mixture Components with MMIE Training, IEEE, Centre de Recherche Informatique de Montreal, pp. 449–452 (1995).

L. Rabiner and B.H. Juang, Fundamentals of Speech Recognition, Prentice Hall pp.ix to xi and 242–389, (1993).

B.H. Juang and S. Katagiri, Discriminative Learning for Minimum Error Classification, IEEE Transactions on Signal Processing, vol.40, No.12. pp.3043–3054 (Dec., 1992).

R.A. Redner and H.F. Walker, Mixture Densities, Maximum Likelihood the and EM Algorithm, Society for Industrial and Applied Mathematics, vol.26, No.2, pp.195–239 (Apr., 1984).

P.H. Winston, Artificial Intelligence, Addison–Wesley Publishing Company, pp.87–136 (1984).

J.C. Amazigo and L.A. Rubenfeld, Advanced Calculus and its Applications to the Engineering and Physical Sciences, John Wiley and Sons, pp. 145–282 (1980).

Stephen H. Friedberg, Arnold J. Insel, and Lawrence E. Spence, Linear Algebra, Prentice–Hall, Inc., pp.358–364, 1979.

*Primary Examiner*—David R. Hudspeth
*Assistant Examiner*—Donald L. Storm
*Attorney, Agent, or Firm*—Michaelson & Wallace; Peter L. Michaelson; Michael P. Straub

[57] ABSTRACT

Methods and apparatus for producing efficiently sized models suitable for pattern recognition purposes are described. Various embodiments are directed to the automated generation, evaluation, and selection of reduced size models from an initial model having a relatively large number of components, e.g., more components than can be stored for a particular intended application. To achieve model size reduction in an automated iterative manner, expectation maximization (EM) model training techniques are combined, in accordance with the present invention, with model size constraints. In one embodiment, a plurality of reduced size models are generated using a LaGrange multiplier from an input model and input size constraints. The plurality of reduced size models are stored in a buffer and scored using a likelihood scoring technique. The one of the reduced size models receiving the highest score may be selected as the reduced size model to be output or used as an input model during future iterations of the model size reduction process. The reduced size model to be used, e.g., for speech, image or other pattern recognition purposes, may be selected from the buffered models produced during multiple iterations of the model size reduction process.

19 Claims, 9 Drawing Sheets

| mixture | 16 | 15 | 14 | 13 | 12 | 11 | 10 | 6 | 5 |
|---------|----|----|----|----|----|----|----|----|----|
| count | 1 | 4 | 5 | 51 | 60 | 15 | 3 | 1 | 1 |

METHODS AND APPARATUS FOR DECREASING THE SIZE OF PATTERN RECOGNITION MODELS BY PRUNING LOW-SCORING MODELS FROM GENERATED SETS OF MODELS

FIELD OF THE INVENTION

The present invention relates to pattern recognition and, more particularly, to methods and apparatus for generating and training models for use in pattern recognition systems, e.g., speech and image recognition systems.

BACKGROUND OF THE INVENTION

Pattern recognition is a problem which is encountered in many applications today. Two common areas in which pattern recognition problems are found are image and speech processing. In image processing, pattern recognition is used, e.g., to recognize a received image and thereby distinguish it from other possible images. In the speech processing context, pattern recognition techniques are used to, e.g., recognize speech. Numerous other pattern recognition applications exist. Pattern recognition generally involves the use of a statistical model. As will be discussed below, there is a need for improved methods and apparatus for generating and training such statistical models.

In as much as speech recognition is a good example of an application where model generation and training is particularly pertinent, the present invention will be discussed primarily in the context of speech recognition systems. However, the following discussion of the present invention as it applies to speech recognition is intended to facilitate the explanation of the present invention without necessarily limiting the invention to the field of speech recognition. In fact, the methods and apparatus of the present invention may be applied to a wide variety of pattern recognition applications.

Speech recognition involves the identification of words, phrases and/or sounds in speech. It generally involves using a speech recognition system including, e.g., a computer, that analyzes the speech using one or more speech recognition models. In speech recognition, different models can be used to represent different words, phrases or sounds. In order to accurately distinguish between similar sounds, the models need to be detailed enough to reflect the distinctions, e.g., in terms of the modeled features, between the sounds being modeled. A variety of different features and/or signal characteristic information may be included in a model with different model parameters normally being used to represent each of the different modeled features or signal characteristics. Hereinafter the terms signal features and signal characteristics will be used interchangeably.

At recognition time, automatic speech recognition (ASR) systems compare various characteristics detected in a received speech segment to speech characteristic information included in previously generated models. ASR systems are frequently implemented on computers using software comprising a speech recognition engine and a set of speech recognition models. The speech recognition engine is the portion of the ASR software that performs the actual speech recognition task using, e.g., the models which are also part of the ASR software. When the speech recognition engine detects a match between a received speech segment and a model, recognition of the word, phrase or sound corresponding to the model is normally said to have occurred.

The models used by the speech recognition engine may be thought of as the fuel that powers the speech recognition engine. As will be discussed below, because of memory constraints in may applications, it is desirable that the models used by a speech recognition engine, be as powerful and compact as possible. That is, given a model size constraint imposed, e.g., due to memory limitations, it is desirable that the models used for speech recognition purposes result in a recognition rate that is as accurate and high as possible. Since a fixed amount of data is often required to store each model component or parameter, a model size constraint may be expressed in terms of the maximum permissible number of model components or parameters.

Many automatic speech recognition systems in use today rely on speech recognition engines which are based on a statistical pattern recognition framework. In such systems, each speech sound to be recognized is modeled by a probabilistic distribution. Such a statistical pattern recognition approach relies heavily on accurate probabilistic models for the acoustics. The models represent run time data used by the speech recognition engine. The accuracy of a model is a function of: 1) the amount of data used to train the model, 2) the particular features which are modeled, and 3) the overall number of modeled features (often represented in terms of model components or parameters).

Limiting the size of the training data base and/or the number of features used in a model can adversely impact the accuracy of the model. In addition, a poor selection of the features to be modeled can result in a less accurate model, when a fixed number of features are included in a model, than could be achieved using a better selection of features to be included in the model. In addition, while adding model components will increase the accuracy of a model when there is adequate data to accurately model the components being added, the inclusion of model components representing features for which there is insufficient training data to accurately model the component being added, will normally result in a decrease in the accuracy of a speech recognizer. Each feature that is modeled may require the generation and storage of several parameters as part of the model.

In most cases, a statistical model is based on an assumption with regard to the form of the distribution of the data, e.g., speech characteristics. For example, assumptions may be made that the modeled data is, e.g., Gaussian, Laplacian, etc. in form. Once and assumption as to the form of the data has been made, a model may be represented as a series of parameters associated with the assumed form. For example, a model may be based on the assumption that a speech segment is mixed-Gaussian in nature, i.e., it can be represented by a sum of Gaussian components. In such an embodiment, each Gaussian component is normally represented by two features, e.g., mean and variance. Where models are based on the assumption that the speech being modeled is mixed Gaussian in nature, a model for a speech segment normally represents a sum of Gaussian components, where a parameter, referred to as a coefficient, is used to indicate the contribution of each component to the overall modeled sound. Additional parameters, e.g., mean and variance parameters, are used to specifically define each individual component included in the mixture. Accordingly, assuming that a model is based on the assumption that the sounds being modeled are mixed Gaussian in nature, three parameters will normally be stored for each Gaussian component, i.e., a first parameter representing the component's coefficient, a second parameter representing the component's mean and a third parameter representing the component's variance.

For example, a model X may be represented by the following equation:

$$\lambda = C_0 g(m_0, v_0) + C_1 g(m_1, v_1 0 + \ldots + C_i g(m_i, v_i)$$

where $\lambda$ represents a mixed Gaussian speech model $C_i$ is a parameter representing the coefficient for the $i^{th}$ Gaussian signal component;

$m_i$ is a parameter representing the mean of the $i^{th}$ Gaussian signal component; and $v_i$ is a parameter representing the variance of the $i^{th}$ Gaussian signal component.

Hidden Markov Models are one example of speech recognition models in use today which may employ mixed Gaussian speech models.

As a practical matter, the cost associated with collecting training data limits, in many cases, the amount of data that can be collected and then used for training models at the time an ASR system is initially deployed. In addition, because of the cost of providing memory in ASR systems, in many cases, the size of the memory available for storing ASR software, e.g., the speech recognition engine and the models used for recognition purposes, is limited.

In actual implementations, the models used for speech recognition purposes may be constrained to an amount of memory which is comparable to that dedicated to storing the speech recognition engine. For instance, a simple acoustic model employing a three-state hidden Markov model (HMM) with 16 Gaussian mixture components, for each of 47 context independent phones, may take up roughly 0.5 MB of memory. To implement an ASR system using such a model on a 1 MB digital signal processing (DSP) board would leave the relatively small amount of only 0.5 MB of memory for implementing the recognition engine and all other supporting routines.

In view of the above, it becomes apparent that it is desirable to limit the complexity and thereby the size of ASR software including the speech recognition engine and the speech recognition modules.

One known and commonly used approach to reducing the size of an acoustic model is referred to as the tied-mixture or the tied-state method. The tied mixture approach involves setting up an equivalence relationship between HMM parameters in different model states or phoneme contexts. For example, similar phoneme contexts for which there is insufficient training data to accurately train each of the phoneme contexts may be grouped or tied together for modeling purposes. As a result of this grouping operation, the number of independent parameters in a model is reduced. The downside to this approach is a loss in acoustic resolution. In the case where the mixture components selected to be tied together are from two different phonetic classes, this method has the undesirable effect of smearing the boundary between the classes. Such a smearing effect reduces the discriminative power of the resulting model, i.e., the power of the model to distinguish between sounds in the different classes.

Another disadvantage of the known tied mixture approach is that both the recognition engine and the generated models are a function of the tying that is performed. As additional data is collected, e.g., after the initial deployment of and ASR system, more accurate modeling of phonetic classes becomes possible. Unfortunately, when the above tied mixture approach is used both the models and the speech recognition engine should be updated together when the tied mixtures are modified. The need to modify the speech recognition engine when updating models using the tied mixture method can result in undesirable down time and expense when upgrading speech recognition systems that are in use.

Accordingly, the known tied mixture approach has several disadvantages as compared to systems where tied mixtures are not used.

Two well known model training and parameter selection methods exist. The first of the model training techniques is referred to as an expectation maximization (EM) method. The second training method is referred to as a minimum classification error (MCE) method. Each of the two known training techniques involves generating an updated model having a fixed number of components from an initial input model having the same number of components. The input model used in the known system represents, e.g., an operator's guess as to what the model should look like. In addition to the input model, the known model training techniques generate the output model from a set of training data, a plurality of inequality constraints, and one overall equality constraint. Either of the two known training methods may be used with the tied mixture modeling technique discussed above.

In as much as the known modeling techniques do not reduce the model size during training, known approaches to generating models for ASR systems with limited memory for storing models involve the initial generation and subsequent training of models which are limited in terms of size (the number of model parameters) to that which can fit into the available memory.

Referring now to FIG. 1, there is illustrated an expected maximization (EM) model training circuit 100. As illustrated, the known circuit 100 receives as its inputs, a set of training data, an M component input model, M inequality constraints, and one overall equality constraint, where M is an integer. The M inequality constraints require the parameters, e.g., the coefficients, the means and the variances in the case of a mixed Gaussian model form, of the M components of the generated model to have non-zero values. The one overall equality constraint imposes the requirement that the sum of the coefficients of all the model components equals to one.

The inputs to the EM model training circuit 100 are supplied to a LaGrange multiplier 110 which is used to process the input data and generate therefrom an updated M component model by generating a new set of parameter values including, e.g., coefficients, mean, and variance values for each component. The selection of the parameter values is performed automatically as part of the process performed by the LaGrange multiplier. The updated model generated by the LaGrange multiplier 110 is supplied to the likelihood scoring circuit 120. The likelihood scoring circuit 120 also receives the set of training data as an input. Given the updated model, the likelihood scoring circuit 120 generates an estimate of how likely the training data is. This score is used as an indicator of the updated model's accuracy. The updated M component model and the score corresponding thereto is supplied to a feedback decision/model selection (FD/MS) circuit 130. The FD/MS circuit 130 is responsible for supplying the updated M component model as an input to the LaGrange multiplier 110. The updated model is processed and another updated model is generated therefrom and scored. The iterative model updating process is repeated a number of times, e.g., until some stop criterion, such as a steady state scoring result, is reached, at which point the iteration process is stopped. Upon achieving the stop criterion one of the generated models is output as the M component model generated by the EM model training circuit 100.

FIG. 2 illustrates a known minimum classification error (MCE) model training circuit 200. The MCE model training circuit 200 is similar in operation to that of the known EM model training circuit 100 in that it performs a model updating step, a scoring step, and a feedback/decision model selection step. The inputs and outputs of the MCE model training circuit 200 are the same as the previously described EM model training circuit 100. Notably, both circuits receive M component input models and output M component models. However, the MCE model training circuit 200 uses a generalized probabilistic descent algorithm performed by the circuit 210 to generate updated model parameters as opposed to using a LaGrange multiplier. Also note that the MCE model training circuit 200 uses an empirical error rate scoring circuit 220 to score the data. This is in contrast to the likelihood scoring circuit used by the EM model training circuit 100.

The known model training circuits 100, 200 illustrated in FIGS. 1 and 2 are useful for modifying model parameter values, e.g., model training, where the generated model is to include the same number of components, and thus parameters, as the input model. However, they fail to address the issue of how to determine the minimum number of model components that can be used, and which of a plurality of possible model components should be used, to achieve a desired level of recognition accuracy.

One known method which attempts to address the problem of determining the minimum number of model components and thus the minimum model size, with which a desired level of recognition accuracy can be achieved, involves a repetitive trial and error process. In accordance with this known trial and error technique, the model generation process is initiated using an initial model having the minimum number of components that the person initiating the training process believes may possibly achieve the desired level of recognition accuracy. The initial model is refined using, e.g., one of the above described known modeling techniques. The score of the generated model is then analyzed, and a determination is made as to whether or not the model will achieve the desired level of recognition accuracy.

In the known technique, if the initial model fails to achieve an acceptable degree of recognition accuracy, both the initial and generated models are discarded, and the process repeated using a new, often operator generated, initial model having more components than the previously generated model. The accuracy of the second generated model is reviewed. If the accuracy of the second model is found to be unacceptable, the process is again repeated using a new initial model having yet more components. The above described steps of model generation, review and discarding of unsatisfactory generated models is repeated until a model which achieves the desired degree of recognition accuracy is achieved.

While the known trial and error approach to determining the number of components that should be included in a model will normally result in a model that achieves a desired degree of recognition accuracy, the known technique has several disadvantages.

One significant disadvantage of the known technique is that it does not address the issue of how to select which of the possible signal components will be most useful in accurately modeling the distinguishing characteristics of the data of interest, e.g., the set of training data. The problem of selecting which components should be used in the model may be thought of in terms of efficiently using data to model specific portions of an image or sound.

For example, consider the case of image pattern recognition where the goal is to generate a model for recognizing different types of trees and each model component corresponds to a fixed amount of data representing a different portion of the tree. If the goal were to distinguish between different types of trees, in terms of model data allocation efficiency, it might be more effective to focus in the model on components that characterize the distinguishing features of the leaves as opposed to non-distinguishing features which characterize tree trunks. Using the known trial and error approach to the inclusion of model components, additional components would be added until a desired recognition rate was achieved. However, in order to achieve the desired recognition rate, the known system might include several unnecessary or relatively unimportant components characterizing the trunk of the tree before including the more important components characterizing the relatively distinguishing features of the tree leaves. The issue is further complicated when the adequacy of the training data is taken into account. Since there is no known method to insure that the collection of the training data will faithfully reflect the signal characteristics, it is more likely than not that the training data may exhibit certain unknown bias that must be precluded in the training process. This is particularly the case when the set of training data is smaller than is desirable. By progressively increasing the model size in a trial and error fashion, one runs the risk of over-fitting the data without an effective way of detecting it.

A frequently used approach to avoid this problem is to further divide the available data into several subsets, using all but one of them as the training set. The remaining one, usually referred to as the development set, is used as the testing data to assess whether over-training has occurred. Because both the training set and the development set may have their own biases, it is a common practice to rotate the data used for the training and the development set. Unfortunately, there is no known guideline as to how many iterations of such practices should be carried out. Even when using the above discussed techniques, the known trial and error method can over fit a model. Thus, the known method may waste precious memory space by including in a model relatively unimportant model components, and the resources (e.g., time) needed to obtain adequate models may be quite demanding.

The known trial and error method for determining the number of components to be included in a model also has the distinct disadvantage of requiring a relatively large amount of human involvement in the model generation process, assuming that the generation of multiple models having different numbers of components is required before obtaining the desired level of recognition accuracy. This is because human involvement is normally required in the known model generation and training methods when new models having a different number of components must be generated to serve as the input to the training circuits illustrated in FIGS. 1 and 2.

In view of the above, it becomes apparent that there is a need for new and improved model training and generation methods. It is desirable that such techniques be capable of being implemented in a more automated manner than the known trial and error techniques. In addition, it is desirable that the models produced by any new methods be compact, i.e., include relatively few components, and still be able to achieve relatively high recognition results. Furthermore, it is desirable that the model generation process allow for future updating of the models, e.g., when additional training data becomes available, without requiring that modifications be made to the search engine before the models can be used.

SUMMARY OF THE PRESENT INVENTION

The present invention is directed to methods and apparatus for generating and training models for use in pattern recognition systems, e.g., speech and image processing systems. In accordance with the present invention, the problem of generating and training models to be used where the available memory for storing such models is limited, is treated as a model size reduction problem. That is, in order to produce a model with a desired size, the present invention takes the somewhat counter intuitive approach of beginning with a model that is larger than desired and then performing one or more size reduction operations on the initial model.

Accordingly, the present invention takes what may be refereed to as a top down approach to model generation, i.e., it begins with a large initial model which is then reduced in size. This is in direct contrast to the prior art trial and error method of generating models which involves beginning with a small model and then increases the size of the model by adding components until satisfactory recognition or scoring rates are achieved.

While the initial generation of an input model used in accordance with the present invention may require some operator involvement as is the case with the described prior art model training circuits illustrated in FIGS. 1 and 2, the present invention has the distinct advantage of automating the process of generating models of different sizes thereby eliminating the need for operator involvement in generating additional input models during the model generation and training method of the present invention. As discussed above, the prior art trial and error model generation and training technique required the generation of a new initial model, with a larger number of components, e.g., with the assistance of an operator, in the event that the initial input model did not produce a model with satisfactory results.

In various embodiments of the present invention expectation maximization (EM) training techniques are coupled with size constraints to produce one or more reduced size models from an initial input model. Such embodiments result in what are refereed to herein as size reducing expectation maximization (SIREM) or enhanced SIREM model training methods and apparatus. In accordance with the SIREM model training process of the present invention, in one embodiment, a LaGrange multiplier is used to implement a modified version of the Baum-Welch algorithm subject to the new and novel model size reducing constraints of the present invention. In this manner the generation of new reduced size models, and the model parameter values associated therewith is achieved in a relatively easy to implement automated manner.

In various embodiments, likelihood scoring is used to evaluate the reduced size models. In accordance with the present invention one or more models produced during one iteration of the size reducing model generating process of the present invention are used as the input to the next iteration of the model size reduction process of the present invention. The model size reducing process of the present invention is repeated one or more times until some preselected stop criteria are satisfied. Upon reaching of the stop criteria a model is selected, e.g., the reduced size model achieving the highest scoring result and still satisfying some maximum size constraint is selected to serve as the result of the model generation process of the present invention.

The model generation and training techniques of the present invention can be combined with exiting model training techniques. In fact, there are many similarities between various embodiments of the SIREM model training process of the present invention and conventional ML training without the use of size reducing constraints. Accordingly, at least in some embodiments, it is relatively easy to combine the SIREM model training technique of the present invention with known EM model training techniques. In such embodiments, known EM model training methods are used to refine input models prior to performing a size reduction operation thereon and/or to refine reduced size models generated in accordance with the present invention without further modifying the size of the already generated reduced size model.

Because the present invention begins with a large model having more components than required and employs statistical methods to determine which of the many components should be removed to reduce model size will optimizing the scoring result, the present invention has the advantage of providing an analytical approach to model component selection and inclusion. This can result in a superior selection of model components than the known method of simply adding components until a desired degree of model accuracy is achieved.

The enhanced SIREM process of the present invention involves the generation of multiple reduced size models from each input model. Evaluation and pruning steps follow the initial model generation step. The model generation, evaluation and pruning steps may be performed in an iterative manner, using one or more models remaining after the pruning step as the input models used during the next iteration of the enhances model size reducing process.

The evaluation step in the enhanced SIREM process involves scoring the generated reduced size models while the pruning step involves eliminating generated reduced size models which do not satisfy preselected scoring criterion. The pruning step may be performed in such a manner that the iterative SIREM process becomes, e.g., a best first or beam search for the best reduced size model that will satisfy some preselected stop criterion, e.g., model size and/or scoring criterion.

By generating multiple reduced size models from each input model the number of potential model configuration considered can be significantly increased while the pruning step avoids the problem of being confronted with such a large number of potential model configurations that subsequent iterations of the size reduction process become overwhelmingly complicated because of the number of models under consideration during any given iteration.

Once model size is determined using the SIREM, enhanced SIREM, or another size reducing model training methods of the present invention, minimum classification error (MCE) training techniques can, and in various embodiments are, used to refine the models produced by the various size reduction methods of the present invention. In this manner, the benefits of both MCE and ML training can be obtained while using the model size reducing methods of the present invention.

Notably, the model generation methods of the present invention avoid many of the problems associated with the known tied mixture approach discussed above.

Many other details, features and embodiments of the present invention are described below in the detailed description that follows.

DETAILED DESCRIPTION

As discussed above, the present invention is directed to methods and apparatus for generating improved models for use in pattern recognition systems, e.g., speech and image recognition systems.

Figure 1:
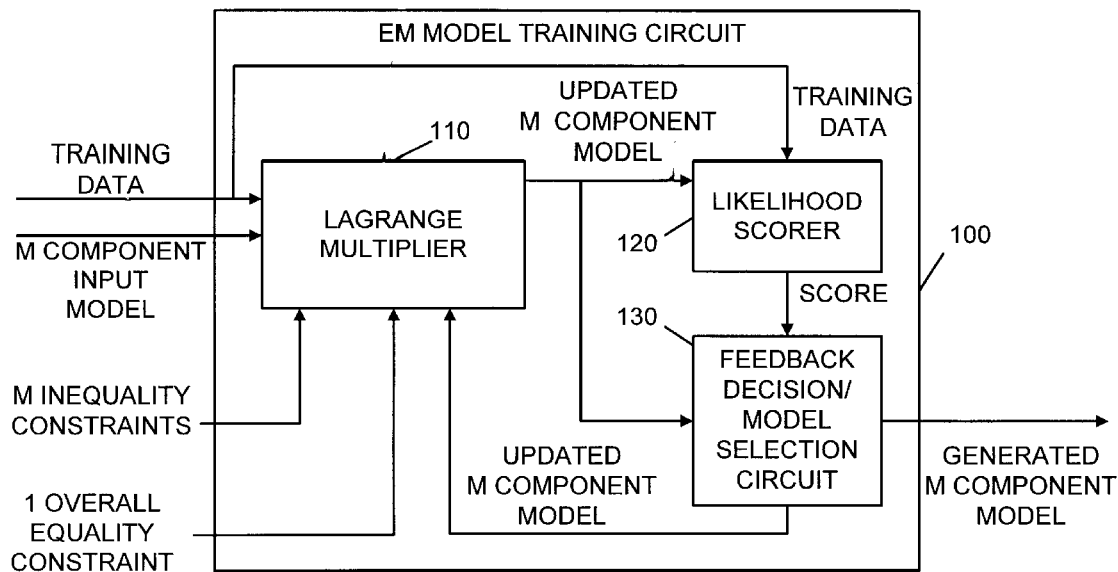
FIG. 1 illustrates a known expectation maximization (EM) model training circuit.
Figure 2:
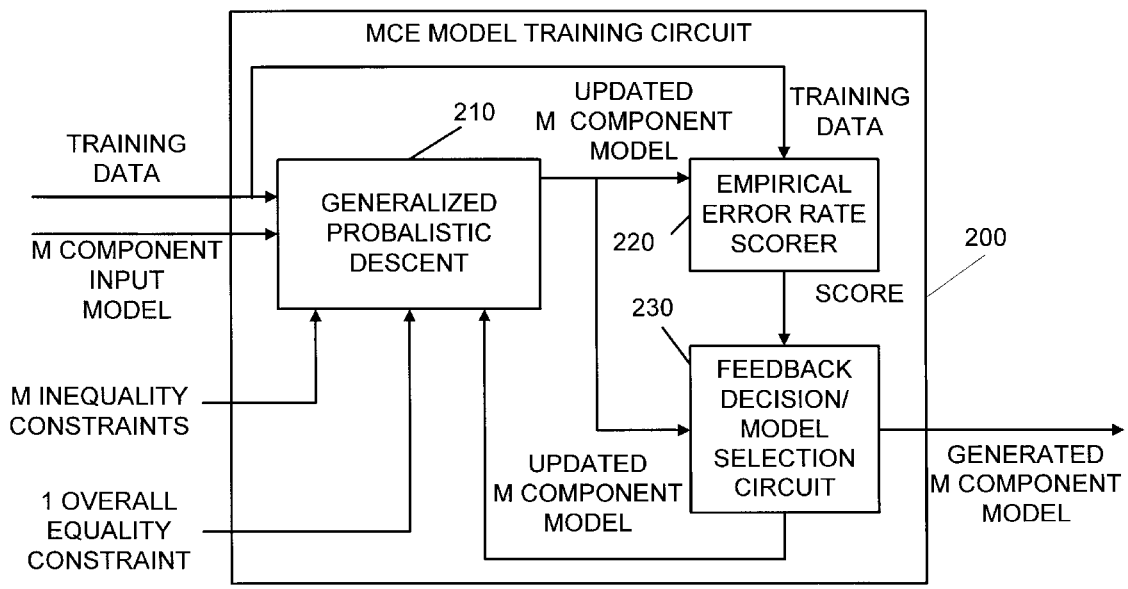
FIG. 2 illustrates a known minimum classification error criterion (MCE) model training circuit.
Figure 3:
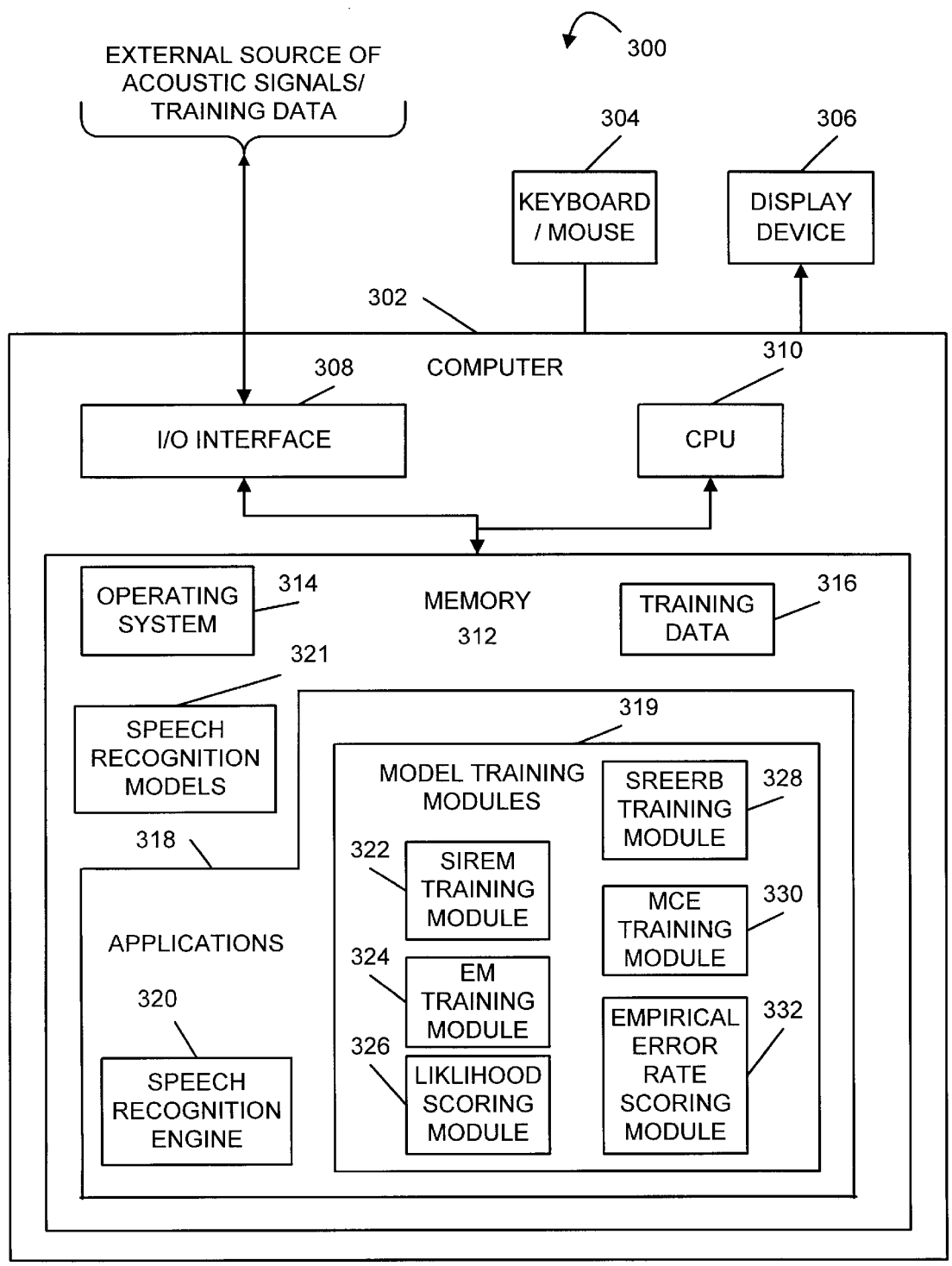
FIG. 3 illustrates a computer system suitable for performing speech recognition model training and speech recognition operations in accordance with the present invention.

FIG. 3 illustrates a computer system 300, suitable for use in performing various model training methods of the present invention. As illustrated, the computer system 300 includes a computer 302, a keyboard/pointing device 304, and a display 306. The computer system 300, is coupled to an external source of acoustic signal and/or training data such as a network data base or other external data source.

The computer 302 includes an input/output (I/O) interface 308 for electrically interfacing the internal components of the computer 302 to the external source of acoustic signals/training data and the external computer system components including the input and output devices, e.g., the keyboard/mouse 304 and the display device 306.

In addition to the I/O interface 308, the computer 302 includes a central processing unit 310 and a memory 312 which may include, e.g., RAM, ROM and one or more additional data storage devices such as hard disk drives. The memory 312 is used to store the computer system's operating system 314, model training data 316, a plurality of speech recognition models 321 and various applications 318. The applications 318 include a plurality of model training modules 319 and a speech recognition engine 320, among others. The model training modules 319 include a size reducing expectation maximization (SIREM) model training module 322, an expectation maximization training module 324, and a likelihood scoring module 326. The model training modules 319 also include a size reducing empirical error rate based (SREERB) training module 328, a minimum classification error criterion (MCE) training module 330, and an empirical error rate scorer 332. In some embodiments the EM training module 324, likelihood scoring module 326, MCE training module 330 and empirical error rate scoring module 332 are implemented in a conventional manner. In other embodiments, the SIREM and EM training modules 322, 324 are combined in accordance with the present invention to maximize software code re-use and eliminate the need to duplicate functionality already available in the EM module when implementing a SIREM training module.

The operation of the computer system 300 and the various training modules stored therein will now be discussed in detail in the explanatory context of generating a speech recognition model.

As discussed above, the prior art trial and error model generation/training technique attempts to address the problem of forming a model having a minimum size by a bottom up approach. That is, the prior art approach begins using an initial model having a minimum number of components. The system operator then generates new models with additional components, trains, and then scores the new models until a desired recognition accuracy level is achieved. In direct contrast to this known approach, the present invention reformulates the problem of generating a minimum size model which will satisfy certain criterion, e.g., objective scoring criterion, to one of performing a size reduction operation on an initial model having a relatively large number of model components, e.g., a number of model components which is larger than the ultimate desired model size. The purpose of the model size reduction operation of the present invention is to achieve a smaller model which will satisfy the scoring criterion and which is more likely to achieve or approximate the minimum possible model size than the known model training technique. Thus, the present invention begins with a large model and reduces the size of the model during the model generation/training process. In many cases, in accordance with the present invention, the initial model will be larger than the useable model size, i.e., it will be intentionally be selected to be too large to store in the speech recognizer for which the model is being generated, with the understanding that the model size will be reduced. Accordingly, in contrast to the prior art, the present invention takes what will be referred to as a top down approach, e.g., it starts with a large model and produces therefrom a smaller model which will satisfy preselected size constraints.

The inventor of the present application has recognized that the problem of reducing model size can be formulated as a constrained optimization problem. That is, given a collection of training data x and an input model $\lambda'$, the problem of obtaining a new model $\hat{\lambda}$ having fewer components as follows:

$$\hat{\lambda} \epsilon arg|min\ C(\lambda;X,\lambda')| |\lambda| \leq N < |\lambda'|$$

where:

$\lambda'$ is an initial input model;

$\lambda$ is a free variable corresponding to all possible models;

$\hat{\lambda}$ represents a generated reduced size model;

$|\lambda|$ denotes the size of the model $\hat{\lambda}$;

$|\lambda'=|$ denotes the size of the model $\lambda'$;

N is the maximum acceptable output model size;

X is a given set of training data; and $C(\lambda;X, \lambda')$ is the cost of choosing a reduced size model $\hat{\lambda}$ from the set of possible models $\lambda$, that meets the specified size constraints given the set of training data X and the initial input model $\lambda'$.

The above formulation of the model reduction algorithm has many similarities with known formulations used for representing the conventional problem of training acoustic models. However, unlike known model training algorithms, the above problem formulation adds the new and significant constraint that a smaller model size result from the resolution of the model training process. That is, in accordance with the present invention, the constraint that N, the maximum output model size, be smaller than the size of the input model λ', is added to the model training problem formulation.

As discussed above, a first known model training process presently in use today involves the use of an expectation maximization (EM) algorithm while a second known model training technique involves the use of a minimum classification error (MCE) algorithm.

In accordance with the present invention, modifications are made to these known training techniques to produce various new and novel training and model size reduction methods. These new and novel training and model generation methods effectively solve equation (1) set forth above.

A first size reducing model training method of the present invention involves the use of expectation maximization (EM) techniques to produce a size reducing expectation maximization (SIREM) model training method. This first method involves the imposition of size constraints in the form of equality constraints during the model training process. These constraints are used to force some of a model's components to assume zero coefficient(s), thereby effectively eliminating one or more components and reducing the model's size.

A second size reducing model training method of the present invention involves the use of various search algorithms and empirical error rate scoring techniques to generate and train reduced size models. This second method also involves the imposition of size constraints, e.g., in the form of model generation control information.

The model generation and training methods of the present invention may be combined, as will be discussed below, with existing model generation techniques. For example, once the size of a model has been fixed using one of the size reducing model training methods of the present invention, the reduced size model can be further refined using conventional ML or MCE training techniques. In addition, what will be referred to herein as enhanced size reduction modeling techniques may be used to consider a large number of potential model configurations while avoiding the need to generate and score various other potential, but probably less efficient, model configurations.

Figure 4:
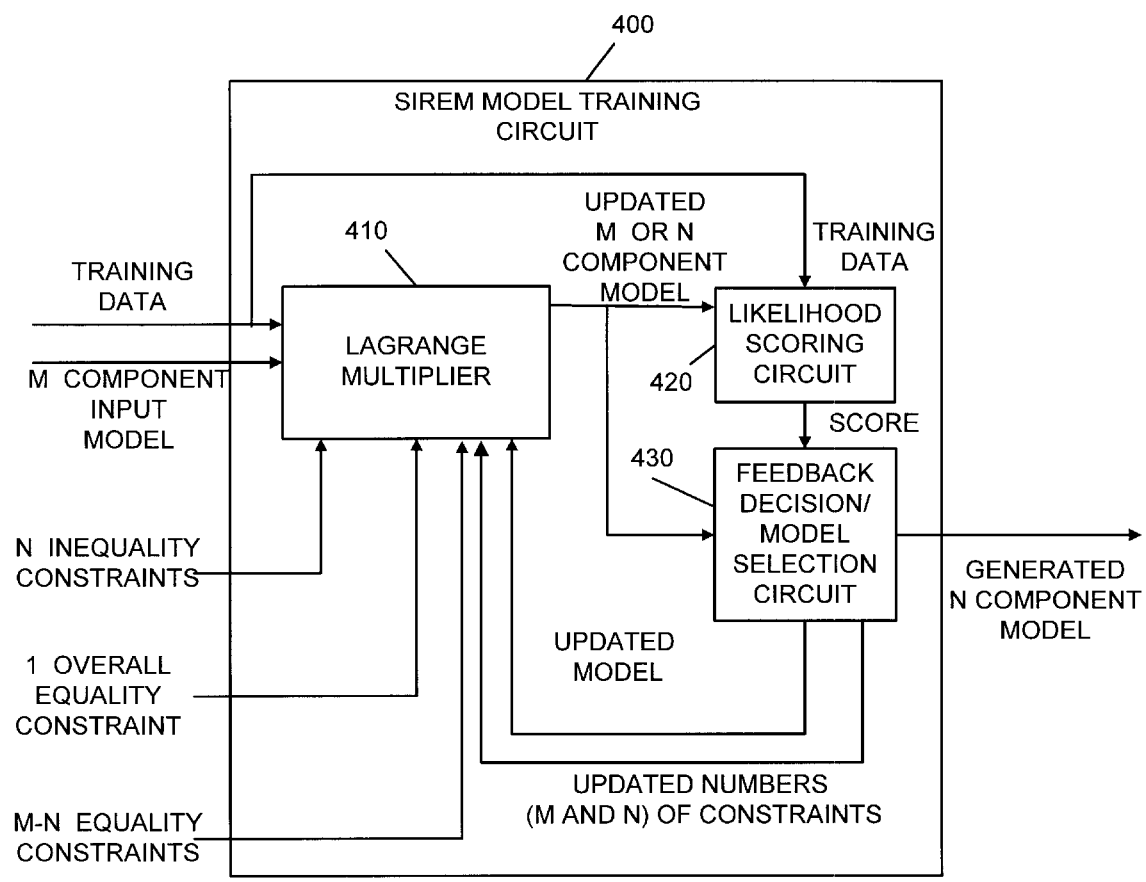
FIG. 4 illustrates a size reducing expectation maximization (SIREM) model training circuit implemented in accordance with one exemplary embodiment of the present invention.

Referring now to FIG. 4, there is illustrated a SIREM model training circuit 400 implemented in accordance with the present invention. The SIREM model training circuit 400 includes a LaGrange multiplier 410, a likelihood scoring circuit 420 and a feedback decision/model selection circuit 430. The circuit 400, and its various components 410, 420, 430 may be implemented by using the application software 318 to configure and control the internal circuitry of the CPU 310. In particular, the SIREM and EM training modules 322, 324 are implemented with the LaGrange multiplier 410 and the feedback decision/model selection circuit 430. Similarly, the likelihood scoring module 326 may be used for implementing the likelihood scoring circuit 420.

As illustrated in FIG. 4, the LaGrange multiplier 410 has a plurality of inputs by which it receives training data, an M component input model, N inequality constraints, 1 overall equality constraint, and M-N equality constraints, where M and N are integers and M is bigger than N.

In accordance with the present invention, the M component input model is a model that is represented as the sum of a plurality of components, e.g., a mixed Gaussian model having M components. Assuming the use of a mixed Gaussian model, each model component has three parameters, i.e., a coefficient, the mean, and the variance of a Gaussian distribution.

The N model inequality constraints are used to control the LaGrange multiplier 410 so that it generates an updated model having N non-trivial, e.g., non-zero, model components derived from the original M model components. In the case of a mixed Gaussian input model, for instance, the LaGrange multiplier generates a non-zero coefficient plus the mean and the variance for each of the N Gaussian components.

The single overall equality constraint input to the LaGrange multiplier 410 is used to insure that the generated model components are consistently weighted, i.e., the sum of their coefficients always equals to a fixed preselected value, e.g., the value 1.

The M-N coefficient equality constraints are used to force M-N of the parameters representing M-N model components to assume the value of zero. This has the effect of eliminating M-N components and results in the LaGrange multiplier 410 producing an N component model which is smaller than the original M component input model.

In accordance with one embodiment of the present invention, the LaGrange multiplier 410 is operated to solve equation (1) which sets forth the new and novel model training problem formulation of the present invention using expectation maximization (EM) model training techniques.

The LaGrange multiplier 410, in conjunction with the new and novel size constraints of the present invention, may be used to realize the Baum-Welch algorithm. The Baum-Welch algorithm is a well known version of the EM algorithm frequently used for training HMMs under non-size reducing ML criterion.

Updated model parameter values, e.g., component coefficients, means and variances, are automatically generated by the LaGrange multiplier as a function of the input constraints.

For a brief discussion of the use of LaGrange multipliers with constraints, see J. C. Amazigo and L. A. Rubenfeld, Advanced Calculus, pp. 145–149 and pp.278–282 (1980).

In addition to the above discussed inputs, the LaGrange multiplier 410 has an updated model feedback input coupled to the feedback decision/model selection circuit 430. The updated model feedback input is used to receive previously generated models which are to be further refined. Additional model size reduction is optional and is normally not used when refining a previously generated reduced size model, e.g., prior to performing one or more additional size reducing operations.

An updated model output of the LaGrange multiplier 410 is coupled to a model input of the likelihood scoring circuit 420 and to a corresponding input of the feedback decision/model selection circuit 430. In addition to having an updated model feedback output coupled to the LaGrange multiplier 410, the feedback decision/model selection circuit 430 has a generated model output for outputting a generated N component model which is selected from one or more updated models produced by the LaGrange multiplier 410.

Figure 5:
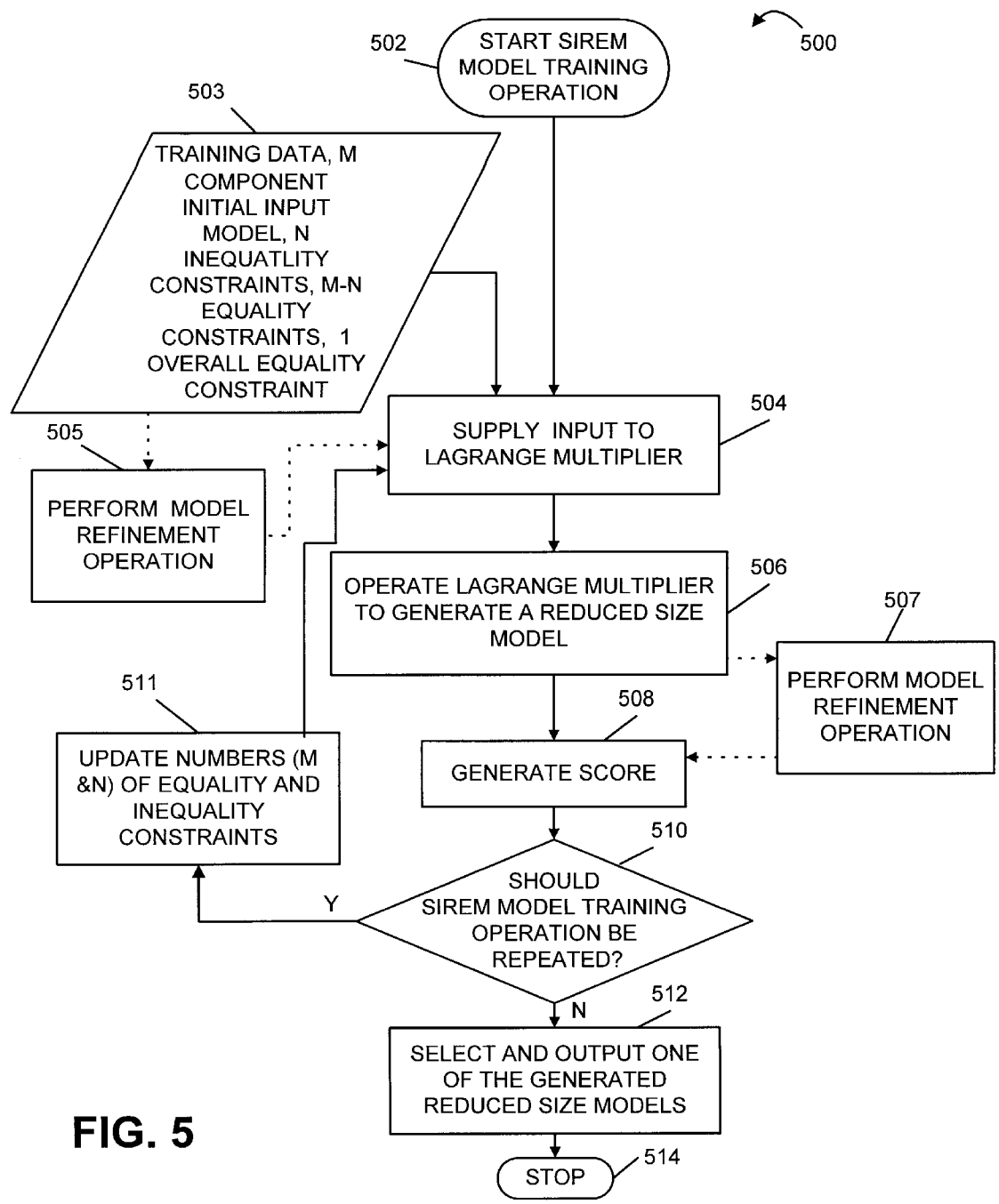
FIG. 5 is a flow chart illustrating the various steps of an exemplary SIREM model training operation.

Operation of the SIREM model training circuit 400 will now be discussed in detail with reference to the flow chart illustrated in FIG. 5.

As illustrated a SIREM model training operation begins with a start step, i.e., step 502. In this step, the CPU 310 performs various initialization operations under the control of, e.g., instructions included in the SIREM and/or EM training modules 322, 324 as well as the likelihood scoring module 326 in order to implement the circuits illustrated in FIG. 400. Operation progresses from step 502, to step 504 wherein the initial input data 503 is supplied to the LaGrange multiplier 504. The input data 503 includes the set of training data, an M component initial input model, N inequality constraints, M–N equality constraints, and 1 overall equality constraint.

In the next step, step 506, the LaGrange multiplier 410 is operated using the input constraints, input set of training data, and M component input model to generate an N component output model where N is less than M.

After the N component model is generated in step 506, operation progresses to step 508. In step 508 a score is generated by the likelihood scoring circuit 420 for the newly generated reduced size model. The score is generated as a function of the set of training data included in the input data 503. The generated N component model and the corresponding score are supplied to the feedback decision/model selection circuit 430. Then, in step 510 a determination is made whether the SIREM model training operation should be repeated.

Step 510 may be performed, e.g., by the feedback decision/model selection circuit 430 by comparing the most recently generated score and/or previously generated scores to various stop criteria. For example, repeating of the SIREM model training operation, and thus reductions in model size, may be repeated until a decrease in the generated score is detected. Alternatively, the SIREM model training operation may be repeated until a preselected change in the score is detected relative to the highest detected score. Yet another approach would be to repeat the SIREM model training operation until, in step 510, after initially exceeding a preselected scoring threshold value, the generated score decreases to a value which is below the preselected threshold value indicative of a desired recognition accuracy level. Numerous other SIREM stop criteria may be used in step 510 to determine if the SIREM model training operation should be repeated or stopped. For example, the occurrence of a fixed number of size reduction operations may be used as a stop criterion.

In selecting an appropriate SIREM model training operation stop criterion, it is useful to note that decreasing model size will, in many cases, initially result in an improvement in the generated model's score since extraneous or inaccurate model components are removed as a result of the size reduction operation. However, as the SIREM model training operation is repeated and model size continually reduced, scoring will eventually decrease due to reductions in model size as the more significant model components are eliminated from the model. Accordingly, as the size reduction process progresses, the score will normally initially increase, reach a maximum value, and then decrease as the model is further reduced in size.

In step 510, if it is determined that the SIREM model training process should be repeated, i.e., the preselected stop criterion have not been satisfied, operation progresses to step 511. In step 511, the values for M, the number of components in the input model, and N, the number of components to remain after the size reduction operation is performed, are updated to reflect that the input model is now the size of the most recently generated model. The number of inequality and equality constraints are also automatically changed as a result of the modifications to the input numbers N and M. In one embodiment, in step 511, the current input value of M, represented here as $M_{current}$, is set equal to $N_{previous}$, i.e., the current input value for M is set equal to the number of components in the most recently generated model ($M_{current} = N_{previous}$). In addition the input value of N, represented herein as $N_{current}$, is set to reflect a new desired reduction in the number of model components, i.e., $N_{current}$ is set equal to the input model size minus the desired size reduction, e.g., $N_{current} = N_{previous} - (M_{previous} - N_{previous})$, where $(M_{previous} - N_{previous})$ represents the desired reduction in the number of model components during one iteration of the size reduction process.

In step 504 the LaGrange Multiplier 410 is supplied with the updated inputs and operation progresses to steps 506, 508 and ultimately 510 once again. With each iteration of the SIREM process, a new reduced sized model is generated and evaluated.

Eventually, in step 510, the determination is made that the preselected SIREM stop criterion have been satisfied and that the SIREM model training operation should no longer be repeated. At this point, operation progresses to step 512. In step 512 one of the generated reduced size models is selected and output as the reduced size model generated by the SIREM model training process of the present invention.

The model selection step 512, may involve the use of various selection criterion. For example, it may involve selecting the smallest generated model satisfying some preselected scoring criterion. In as much as the model selection criterion and model stop criterion may be similar, steps 510 and 512 may be performed by a single circuit or software module, i.e., the feedback decision/model selection circuit 430 illustrated in FIG. 4.

Once a reduced size model has been output as the result of the SIREM model training operation 500, operation progresses to step 514, the STOP step, wherein the SIREM model training operation is stopped until another input model is to be processed.

In accordance with various embodiments of the present invention, the models generated or input to the SIREM model training process of the present invention are refined, without a reduction in model size, using conventional model training techniques. In FIG. 5, optional model refinement steps 503, 507 are illustrated as being inserted, via the use of dotted lines, into the SIREM model training process 500.

In accordance with one embodiment of the present invention, a model refinement operation is performed in step 503 prior to the performing of a size reduction operation thereon in step 506. In the model refinement step 503, conventional ML model training techniques are used to refine the model being processed. Other known model refinement techniques may also be used. The components of the present invention are well suited for performing a ML model refinement operation. In fact, the LaGrange multiplier 410 used in the SIREM process, the likelihood scoring circuit 420, and the feedback decision/model selection circuit 430 may all be used in the model refinement process. However, when being used for model refinement as opposed to size reduction, the size reducing constraints are not used by the LaGrange multiplier 410, and a different set of stop and model selection criteria are used by the feedback decision/model selection circuit 430. The non size reducing ML training process may be repeated, for model refinement, e.g., until a steady state scoring result or some other stop criterion is detected. If refinement of the input model is performed in step 503, it is the refined model that is supplied in step 504 to the LaGrange multiplier 410 for purposes of performing a size reduction operation thereon in step 506.

In another embodiment, a model refinement operation 507 is performed on reduced size models generated by the LaGrange multiplier 506. After the reduced size model is refined using, e.g., known ML model training techniques, it is the refined model that is then scored and used for additional size reduction purposes or is selected to be output as the result of the SIREM model training process 500.

In addition to using known model refinement techniques during the SIREM model training process 500, in accordance with one embodiment of the present invention, the SIREM model training process 500 of the present invention is combined with the known MCE model training process. That is, the SIREM model training process 500 of the present invention is used to generate a model having the ultimate desired number of signal components. MCE model training such as that performed by circuit 200 is then used for further model refinement without modifying the number of model components. In this manner, the advantage of the automated model size selection process of the present invention can and is combined with existing MCE training techniques.

The above SIREM model training operation described above with regard to FIGS. 4 and 5, may be characterized as a basic SIREM model training operation because a single (potentially multi-component) reduction in model size is performed for each size reducing iteration. Thus, in a basic SIREM operation, a single reduced size model is produced from each model input to the LaGrange multiplier 410. What will now be referred to as an enhanced SIREM operation will now be described with regard to FIGS. 6, 7 and 8. An enhanced SIREM model training operation in accordance with the present invention, involves generating a plurality of reduced size models, from each input model, during each iteration of the size reduction process. Each of the reduced size models will normally have a different number of model components. As part of the enhanced SIREM operation, one or more of the generated reduced size models, e.g., the most promising of the models, are selected for use in generating new models. The selection operation may be performed by pruning models achieving low scores. As will be discussed further below with regard to FIG. 8, the enhanced SIREM operation of the present invention may be performed in an automated iterative manner with multiple reduced size models being generated and evaluated during each iteration of the model size reduction process.

Figure 6:
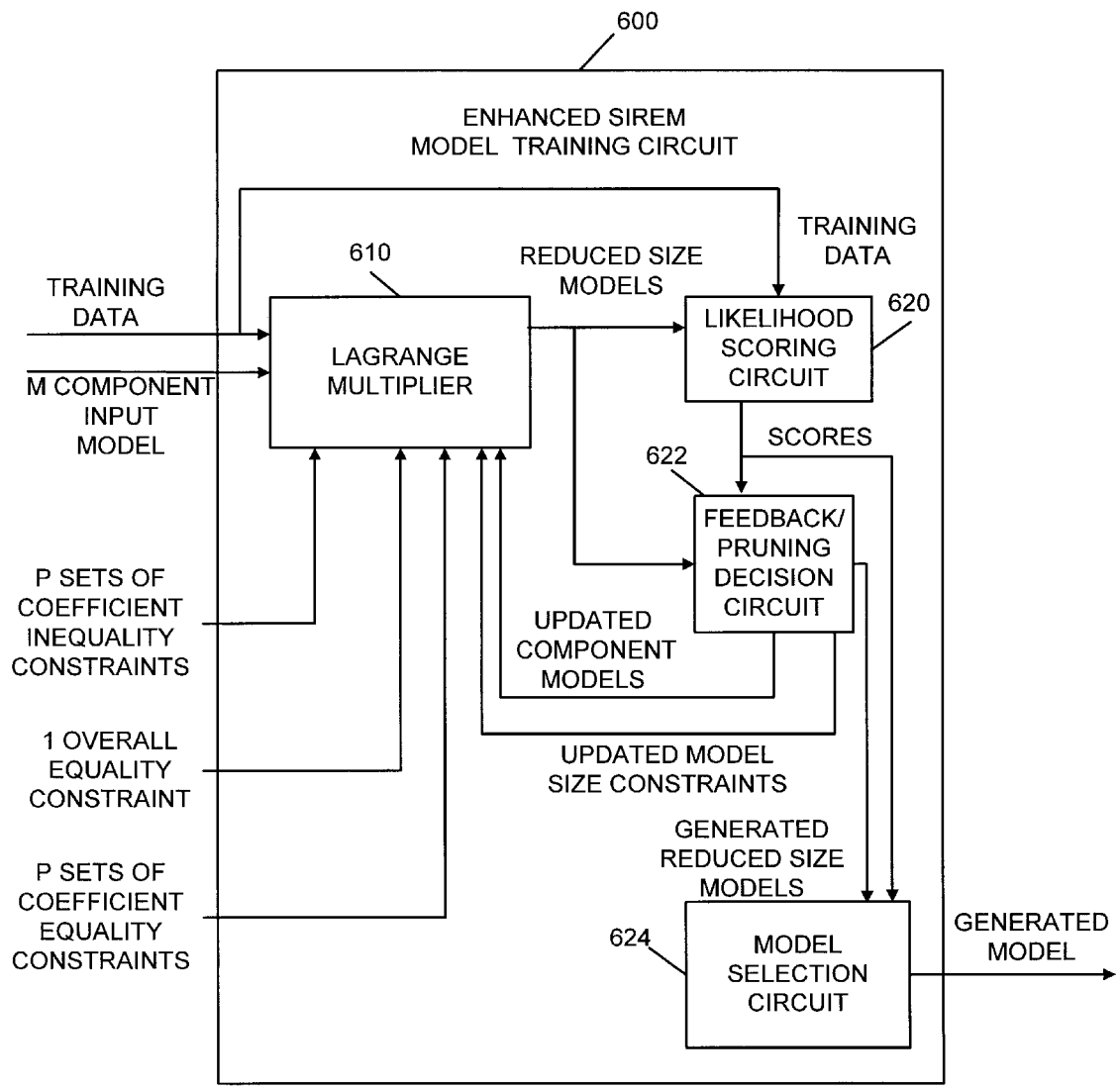
FIG. 6 illustrates an enhanced SIREM model training circuit.

Referring now to FIG. 6, there is illustrated an enhanced SIREM model training circuit 600 implemented in accordance with one embodiment of the present invention. The enhanced SIREM model training circuit 600 includes a LaGrange multiplier 610, a likelihood scoring circuit 620, a feedback/pruning decision circuit 622, and a model selection circuit 624 coupled together as illustrated in FIG. 6.

While the components of the enhanced SIREM model training circuit 600 bear many similarities to those of the FIG. 4 embodiment, it should be noted that the components of the FIG. 6 embodiment are designed to handle and process a plurality of reduced size models during each iteration of the SIREM process. For example, the LaGrange multiplier 610 receives as its initial input a set of training data, a single M component input model, 1 overall equality constraint, and P sets of inequality and equality constraints. For each one of the P sets of inequality constraints a single reduced size model will be generated from the input model by the LaGrange multiplier 610. Thus, supplying a single input model and P sets of constraints to the LaGrange multiplier 610 results in the production of P reduced size models. As in the case of the FIG. 4 embodiment, the likelihood scoring circuit 624 is used for generating likelihood scores for the reduced size models generated by the LaGrange multiplier 610. As will be discussed in greater detail below, the feedback/pruning decision circuit 622 is used to control the number of iterative size reduction operations performed, where the reduced size models are used as the input model(s) for the iterative size reduction operations. Once the feedback/pruning decision circuit 622 has determined that the size reduction stop criterion has been satisfied, the model selection circuit 624 is used to select which one of the reduced size models is ultimately selected to be output as the final reduced size model produced by the enhanced SIREM model training circuit 600.

Figure 7:
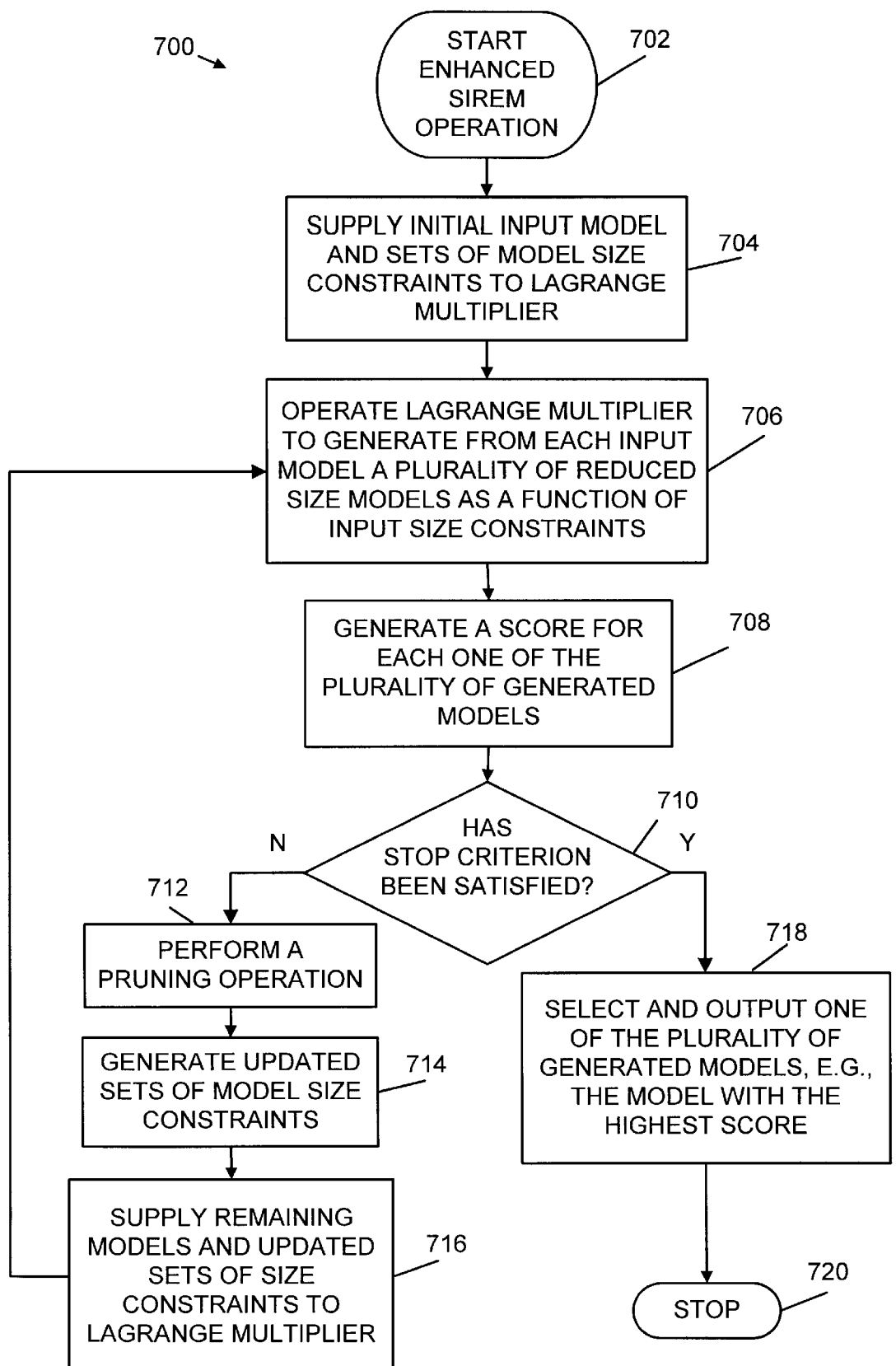
FIG. 7 is a flow chart illustrating the steps involved in performing an enhanced SIREM model training operation in accordance with the present invention.

FIG. 7 is a flow chart illustrating the steps involved in performing an enhanced SIREM model training operation 700. As illustrated, the enhanced SIREM model training operation begins with the start step 702 wherein various initialization operations occur. Operation progresses from the start step 702, to step 704, wherein an initial input model, e.g., having M components, is supplied to the LaGrange multiplier 610. In addition to the input model the LaGrange multiplier 610 is supplied in step 704 with 1 overall equality constraint and a plurality of, e.g., P sets, of model size constraints. The P sets of size constraints include both equality and inequality constraints. The equality constraints have the effect of forcing the parameters representing one or more model components to assume zero coefficient(s) during the generation of the reduced size models by the LaGrange multiplier 610.

Operation progresses from step 704, to step 706, wherein the LaGrange multiplier 610 is operated to generate, as a function of the sets of size constraints supplied thereto, a plurality of reduced size models. The plurality of reduced size models generated in step 706 are supplied in step 708 to the likelihood scoring circuit 624. The scoring circuit 624 is operated to generate a score for each of the reduced size models generated by the LaGrange multiplier 610.

Once the scores are generated for the plurality of reduced size models generated in step 706, operation progress to the determination step 710. In step 710 a determination is made, e.g., by the feedback/pruning decision circuit 622, as to whether preselected stop criterion has been satisfied. The stop criterion may be, e.g., the occurrence of a preselected number of iterations of the reduced model generation step, or the detection of a preselected change in model score values from a set of scores associated with a previously generated set of reduced size models.

In step 710, if it is determined that the preselected stop criterion has not been satisfied, operation progresses to step 712, wherein a pruning operation is performed. Various pruning techniques may be used to eliminate one or more of the reduced size models from further consideration based on, e.g., the low score of the models selected for elimination. By pruning low scoring models, the higher scoring models are selected for further processing and consideration. In one embodiment all models but for the few models having the highest score are eliminated from consideration during each iteration of the model size reduction process by pruning. The pruning of all models except the few best ones results in what is often characterized as a beam search for a reduced size model satisfying the preselected criterion.

The pruning step 712 may also be carried out in such a manner that other types of searches be implemented for a reduced size model. For example, the pruning step may be implemented so as to feed only the highest scoring model as the input to the LaGrange multiplier 610 for size reduction. In such an embodiment, the remaining models are temporarily stored in a buffer included in the feedback/pruning decision circuit 622. The stored models will be compared against the size-reduced models derived from the highest scoring one. In effect, a pool of models that consists of the newly reduced models (outputs from circuit 624), and those stored in the buffer, is created. Once again, from this pool of models, the highest scoring model having at least one fewer component than the largest model input to the LaGrange multiplier 610 is chosen. The selected model is then fed to the LaGrange multiplier 610 during the next size reducing iteration while the remaining models are retained in the buffer. If the number of the remaining models exceeds the buffer's storage capacity, the lowest scoring models are discarded. This type of pruning will result in what is known as a best first search.

From step 712, wherein pruning occurs, operation progresses to step 714. In step 714 a new set of model size constraints is generated for each of the reduced size models which have not been eliminated from consideration as a result of the pruning step 712.

After the new sets of model size constraints are generated in step 714, in step 716 they are supplied, along with the models which still remain under consideration, as inputs to the LaGrange multiplier 610. The repeated operation of the LaGrange multiplier in step 716 marks the start of a new iteration of the model size reducing process of the present invention.

In step 710, if it is determined that the stop criterion has been satisfied, operation progresses to step 718. In step 718 one of the plurality of generated models, e.g., the one of the models produced from the most recent operation of the LaGrange multiplier 610 that has the highest score, is selected as the output of the enhanced SIREM model training circuit 600.

Operation progresses from the output step 718 to the stop step 720 where the operation of the circuit 600 is halted pending the input of a new initial model to be processed.

Figure 8:
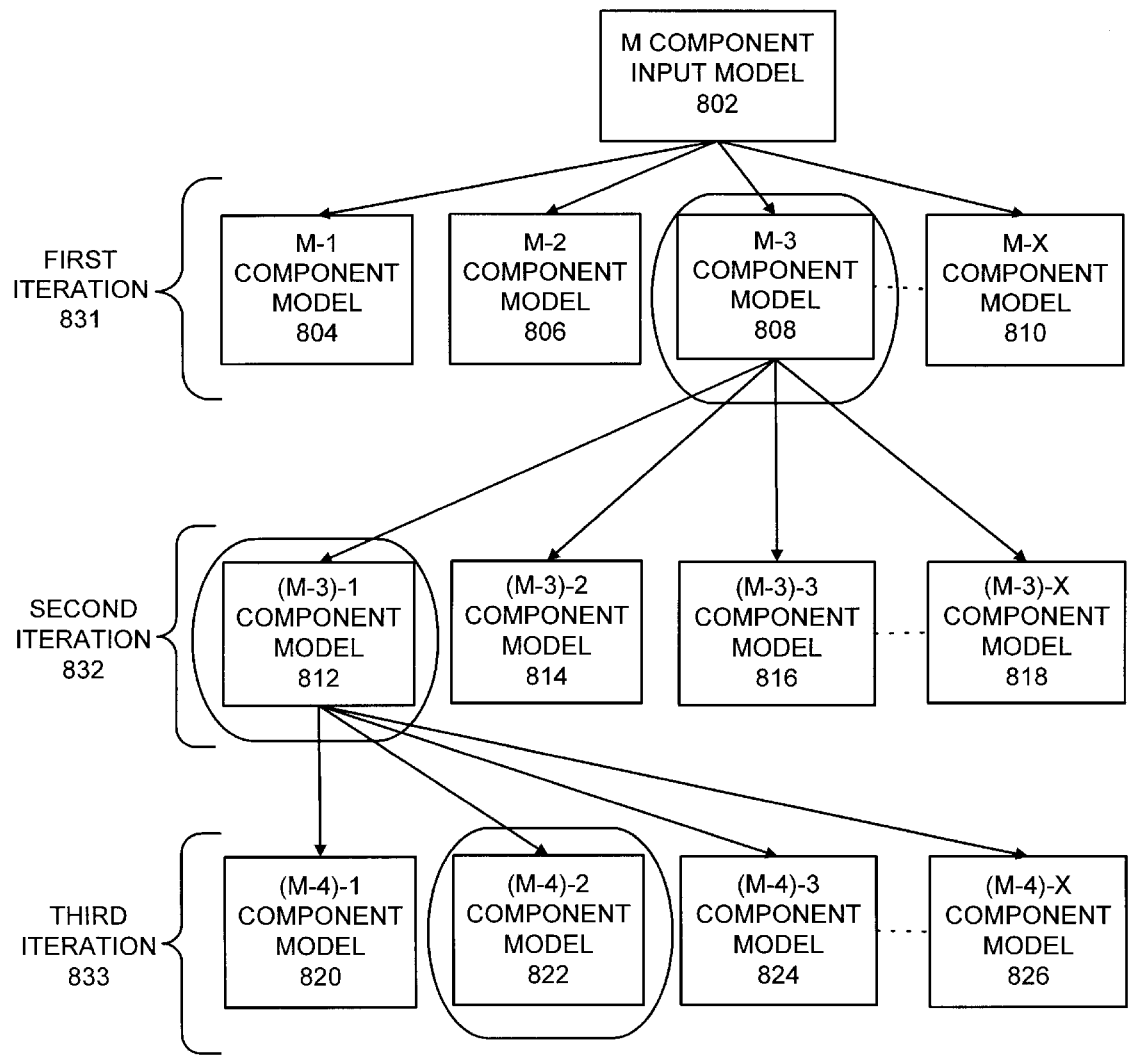
FIG. 8 is a chart illustrating the various models that are generated and processed as part of an enhanced SIREM model training operation in one exemplary embodiment.

FIG. 8 illustrates the exemplary result of an enhanced SIREM model training operation involving 3 iterations of the model size reducing process of the present invention. As illustrated, the input model 802 includes M components. In the illustrated example, during each of the first, second, and third size reduction process iterations the LaGrange multiplier 610 is supplied with a single input model and P sets 831, 832, 833 of size constraints from which P reduced size models are generated during each iteration of the model size reducing process.

In the FIG. 8 example, each of the P sets of size constraints includes both equality and inequality constraints. The size constraints used in the FIG. 8 example are selected to produce models having, from one to X, fewer components than the model input to the LaGrange multiplier 610.

Operating the LaGrange multiplier 610, in step 706 to process the initial model 802 using the P sets of size constraints, results in the production of the first set 831 of P reduced size models 804, 806, 808, 810. Note that these models have from 1 to X fewer components than the initial M component input model 802. The reduced size models produced during the first iteration of the size reduction process are scored by the likelihood scorer 620, in step 708. The resulting scores, reduced size models, and/or information regarding the number of model size reduction iterations that have been performed are supplied to the feedback/pruning decision circuit 622. The circuit 622 compares, in step 710, at least some of this data to preselected stop criterion. In the FIG. 8 example, the models produced by the first iteration of the size reduction process do not satisfy the stop criterion. Accordingly, in step 712, a pruning operation is performed on the first set 831 of P models 804, 806, 808, 810.

In the case of the FIG. 8 example, pruning is performed so that a beam search (with a beam width of 1) is conducted for the desired reduced size model. Accordingly, all but the best, i.e., highest scoring model, is pruned. The oval in FIG. 8 around model 808 indicates that model 808 is the model which remains after the first pruning operation has been performed. Model 808 has 3 fewer components than the original input model 802. It is this reduced size model 808 which serves as the input to the LaGrange multiplier 610 at the start of the next (second) iteration of the model size reduction process of the present invention.

After pruning updated sets of model size constraints are generated. This involves, e.g., processing the previously used sets of size constraints to reflect the fact that the input model size at the start of the second iteration has 3 fewer components, in the case of the FIG. 8 example, than did the previously processed model. Accordingly, in this example, the number of equality constraints and inequality constraints, corresponding to each reduced size model to be generated, is reduced by the same number as the reduction in the number of input model components. In this example, the number of equality and the number of inequality constraints, corresponding to each of the P reduced size models to be generated from the input model, is reduced by three.

The single model 808 remaining after the pruning step 712, and the updated model size constraints generated in step 714, are supplied in step 716 to the LaGrange multiplier 610.

The operation of the LaGrange multiplier 610 in accordance with step 706, for the second time, marks the start of the second iteration of the model size reduction process. The LaGrange multiplier 610 generates from model 808 and the updated size constraints a second set 832 of reduced size models 812, 814, 816 and 818. Note that these models have from 4 to (M−3)−X fewer components than the original input model 802.

The reduced size models produced during the second iteration of the size reduction process are scored by the likelihood scorer 620 in step 708. The resulting scores, reduced size models, and/or information regarding the number of model size reduction iterations that have been performed are then supplied to the feedback/pruning decision circuit 622. In step 710, the circuit 622 compares at least some of this data to the preselected stop criterion. In the FIG. 8 example, the models produced by the first iteration of the size reduction processes do not satisfy the stop criterion. Accordingly, in step 712, a pruning operation is performed on the second set 832 of models 812, 814, 816, 818.

As discussed above, in the case of the FIG. 8 example, pruning is performed so that a beam search with a beam width of 1 is conducted for the desired reduced size model. Accordingly, all but the best, e.g., highest scoring model, is pruned. The oval in FIG. 8 around model 812 indicates that model 812 is the model which remains after the pruning operation has been performed. Model 812 has one fewer component than model 808 and 4 fewer components than the original input model 802. It is this model 812 that is used as the input to the LaGrange multiplier 610 at the start of the next, i.e., third, iteration of the model size reduction process.

After pruning, in step 714, updated sets of model size constraints are generated for a second time. This involves, e.g., processing the previously used size constraints to reflect that the input model size at the start of the third iteration has 1 fewer component, in the case of the FIG. 8 example, than did the previously processed model 808. Accordingly, in this example, the number of equality constraints and inequality constraints corresponding to each reduced size model to be generated is reduced by one as compared to the number of constraints used to generate the previous set 832 of reduced size models 812, 814, 816, 818.

The single model 812, remaining after the pruning step 712, and the updated model size constraints generated in step 714, are supplied in step 716 to the LaGrange multiplier 610.

Operation of the LaGrange multiplier 610 in accordance with step 706, for the third time, marks the start of the third iteration of the model size reduction process. The LaGrange multiplier 610 generates from model 812 and the updated size constraints, a third set 833 of reduced size models 820, 822, 824, 826. Note that these models have from 5 to (M−4)-X fewer components than the original input model 802.

The reduced size models produced during the third iteration of the size reduction process are scored by the likelihood scorer 620 in step 708. Once again the resulting scores, the reduced size models, and/or information regarding the number of model size reduction iterations that have been performed are supplied to the feedback/pruning decision circuit 622. The circuit 622 compares at least some of the data supplied to it to the preselected stop criterion.

In the FIG. 8 example, during this third iteration through step 710, it is determined that the preselected stop criterion have been satisfied. An example of such stop criterion might be a decrease of a preselected amount in the highest score associated with the most recent set of models, as compared to the highest score associated with the immediately preceding set of models.

With the stop criterion having been satisfied in step 710, operation progresses to step 718 wherein one of the numerous previously generated reduced size models is selected as the output of the enhanced SIREM model training operation. The generated reduced size models and associated scores are supplied to the model selection circuit 614 throughout the model generation process. On or more of the models and scores are stored by the model selection circuit 624 until such time as the selection of the final output model is to occur.

In as much as the model selection circuit 624 has available to it reduced size models generated from multiple iterations of the model size reduction process of the present invention, the reduced size model selected to be output may, but need not be, from any one of the size reduction iterations. In the FIG. 8 example, the output model is selected from most recent iteration of the model size reduction process.

In the FIG. 8, model 822 is surrounded by an oval indicating its selection, in step 718. Thus, in the FIG. 8 example, model 822 serves as the output of the enhanced SIREM model training operation 700.

Note that the output model 822 may include the same number of components as other reduced size models generated during other iterations of the SIREM process. However, as a result of the pruning and iteration process performed as part of the enhanced SIREM model training process of the present invention, the selected model 822 is likely to have superior accuracy characteristics over other models of the same size which were considered but rejected as the result of a pruning operation.

Assume for example that the input model 802 in the FIG. 8 component included 15 components (M=15) and that P=6. In such a case, the final model 822 produced by the third iteration of the size reduction process would have (15−4)−2=9 components. Models 810 and 816, generated during the first and second iterations of the model size reduction process, would have the same number of components. However, these models are likely to have an inferior degree of accuracy to that of model 822 (as suggested by their pruning) because different components were included in the models 810, 816 and/or their component parameters had different values than that of model 822.

Figures 9, 10:
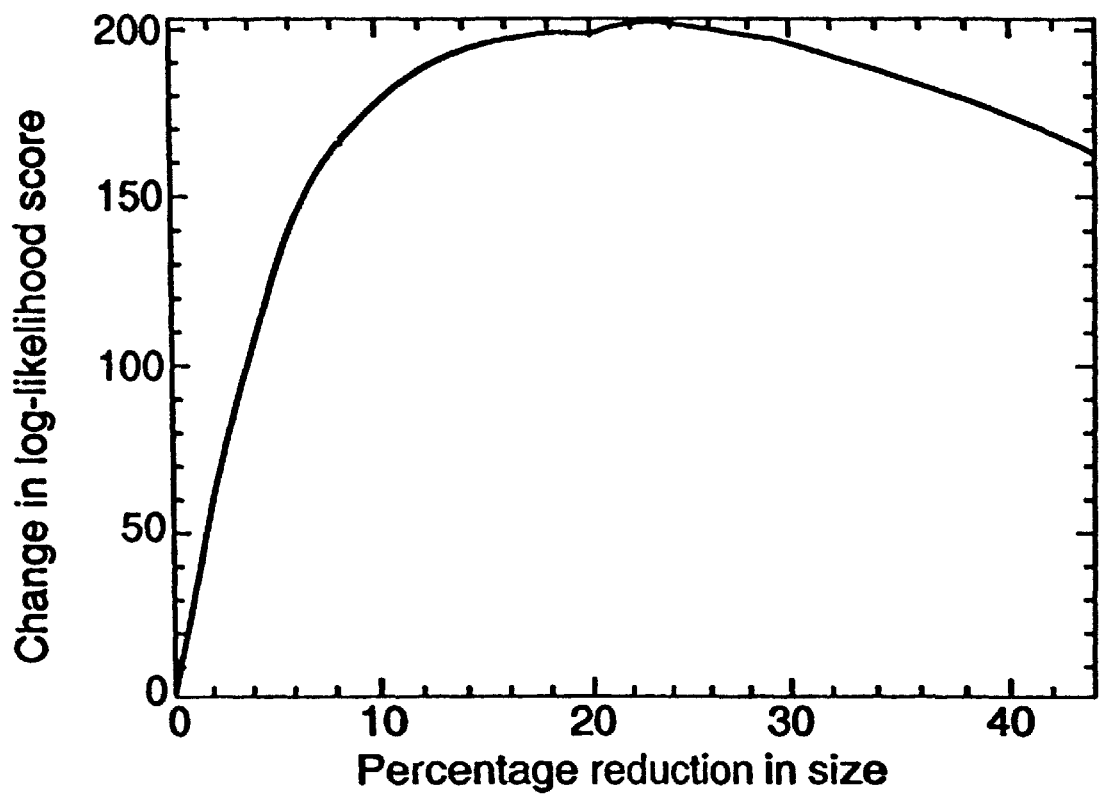
FIG. 9 is a chart illustrating the change in scoring resulting from various degrees of model size reduction that occurred during one particular test of the SIREM model training process of the present invention.
FIG. 10 is a table showing results of the same model training process for which model scoring results are plotted in FIG. 9.

Results from one experiment conducted to evaluate the SIREM model training process of the present invention, in the context of an automated speech recognition application, are illustrated in FIGS. 9 and 10. In the experiment, the NYNEX PhoneBook Database was used as the set of training data. This database is a phonetically-rich, isolated-word, telephone-speech database which is publicly available and can be ordered from the Linguistic Data Consortium which has an internet site located at www.ldc.upenn.edu.

In the experiment, each phoneme in the PhoneBook database was modeled using 47 context-independent models, each of these models was represented using a three-state HMM model. For modeling purposes, it was assumed that the acoustic distribution for each HMM state to be modeled was a Gaussian mixture density. In the experiment, the initial model used to represent each state was selected to have a mixture of 16 Gaussian components. This number of components reflected a model size that was considerably larger than desired and too large to fit into the memory available for such models in the actual speech recognizers.

Thus, at the start of the experiment a total of 2256 Gaussian components were used to model the entire Phone-Book database. (2256 Gaussian components=(47 phone models×3 HMM states/phone model×16 Gaussian components/HMM state))

The SIREM process of the present invention was performed on each of the initial 141 16-component models used to represent the total of 141 different HMM states being modeled.

The results illustrated in FIGS. 9 and 10 were obtained by using the SIREM model training process of the present invention on each of the initial 141 different HMM state models.

As discussed above, in the experiment each initial model began with 16 components. During the performed SIREM training operation a single Gaussian component was eliminated during each iteration of the size reduction process and a single reduced size model generated for each model being processed.

In evaluating the scores of reduced size models generated during the experiment, the change in the per-frame per-state log-likelihood score was calculated and recorded for each reduced size acoustic model produced. The accumulated change in the recorded score versus the reduction in model size associated with the recorded scores are plotted in FIG. 9 as a single combined plot for the entire 141 HMM state models that were processed.

The experimental results indicate that, at least in the experimental context, using 16-component mixtures for all states used in modeling the PhoneBook database results in the use of an unnecessarily large number of model parameters which, in fact, not only wastes available memory resources but also negatively impacts the scoring results.

As illustrated in FIG. 9, significant increases in the likelihood score were achieved during the experiment by moderately decreasing the number of components used in the models representing the 141 modeled HMM states.

During the experiment, it was observed that the use of 15 component Gaussian mixtures provided superior score results as compared to the 16 component mixtures from which they were generated, for almost all of the modeled HMM states. However, beyond the reduction to 15 model components, it was noted that the selection of which and how many Gaussian mixture components to eliminate in accordance with the SIREM process of the present invention, was mostly data driven. For instance, it was noted that the mixtures used for modeling silence states tended to achieve the highest likelihood scores when represented by a relatively large number of components. However, mixtures used for modeling some states showed improved performance while being down-sized to a relatively few number of components.

The first row of FIG. 10 illustrates different numbers of components which were found to result in optimal scoring results for the 141 modeled HMM states. The second row of FIG. 10 illustrates the number of states, out of the 141 modeled states, which were found to be optimally modeled by the number of components listed in the corresponding column of the first row.

For example, it was found that only one of the 141 modeled HMM states achieved the highest score using likelihood scoring methods when 16 components were used to represent the modeled state. Four modeled HMM states achieved the highest score when 15 component mixtures were used. Notably, the largest number of modeled HMM states, i.e., 60 of the 141 modeled HMM states, achieved the highest score when 12 component mixtures were used to model the states.

A review of the results set forth in FIGS. 9 and 10 indicate that in the case of this particular experiment, the trend of increasing likelihood scores is reversed, on average, when approximately a 23% reduction in model size from the initial 16 component model size is achieved. The above discussed experimental results suggest that, for context-independent phone models trained on the PhoneBook database, acoustic models with an average of 12 Gaussian mixture components is suitable when performing training under ML criterion.

Figure 11:
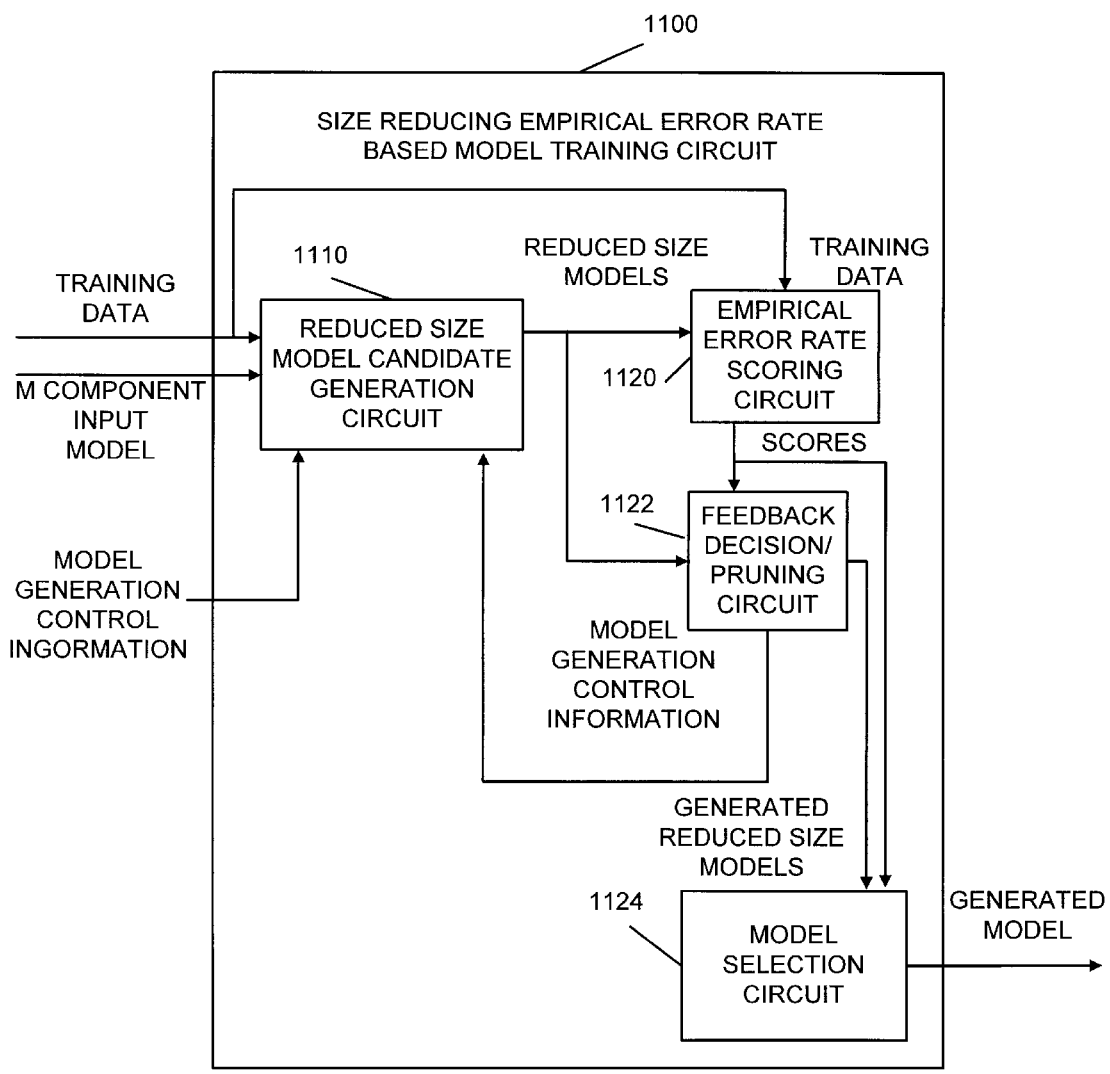
FIG. 11 illustrates an empirical error rate based size reducing model training circuit implemented in accordance with yet another embodiment of the present invention.

Referring now to FIG. 11, there is illustrated yet another embodiment of a size reduction model training circuit implement in accordance with the present invention. As illustrated, the size reducing empirical error rate based (SREERB) model training circuit 1100. The SREERB model training circuit 1100 includes a reduced size model candidate generation circuit 1110 for generating from an input model one or more reduced size models, an empirical error rate scoring circuit for generating scores for models output by the model generation circuit 1110, a feedback decision pruning circuit 1122 and a model selection circuit 1124 which are coupled together as illustrated in FIG. 11.

The operation of the SREERB model training circuit is similar to that discussed above with regard to the FIG. 6 embodiment. However, unlike the FIG. 6 embodiment the FIG. 11 embodiment does not use a LaGrange multiplier for the generation of the reduced size models and, instead of using likelihood scoring, the FIG. 11 embodiment uses empirical error rate scoring. To reduce the number of reduced size models considered from the many possible model permutations, the FIG. 11 embodiment is capable of using a plurality of search algorithms such as best first and beam search in addition to others to control pruning and thus the elimination of models which are not likely to achieve the desired scoring results from consideration and/or use for the generation of additional models.

While the present invention has been discussed in terms of a size reducing embodiment, it will be apparent to one of ordinary skill in the art that the methods and apparatus of the present invention may be used for iteratively increasing the size of a model by using model size constraints which require the addition of model components as opposed to the elimination of model components. In such an embodiment, the model generated during each iteration of the model enlargement process is used as the input to the next model enlargement process thereby automating the model generation process. In the case of a model enlargement process, the size constraints for an M component input model to a LaGrange multiplier would include M+1 or more inequality constraints in addition to one overall equality constraint. During a model enlargement process, a feedback decision/model selection circuit, such as the circuit 622, can be controlled to stop the iterative model enlargement process upon reaching a preselected stop criterion, e.g., when a maximum allowable model size is reached or a decline in the scores of the models being generated is detected.

What is claimed is:

1. A method of generating a reduced size pattern recognition model from an input pattern recognition model using a computer system including a model training routine, the input pattern recognition model including a plurality of components, the method comprising the step of operating the computer system under direction of the model training routine to perform the steps of:

i) directly generating from the input pattern recognition model, as a function of a set of model size constraints, a plurality of reduced size pattern recognition models, the plurality of reduced size pattern recognition models including at least two reduced size pattern recognition models, each reduced size pattern recognition model having fewer model components than the input pattern recognition model, at least one of the reduced size pattern recognition models having two fewer components than the input pattern recognition model;

ii) scoring the reduced size pattern recognition models included in the plurality of reduced size pattern recognition models; and iii) outputting one of the generated reduced size models.

2. The method of claim 1, wherein scores are generated by said scoring step, the method further comprising the step of operating the computer system to perform the step of:

storing the plurality of reduced size models and the generated scores in a memory device.

3. The method of claim 1, wherein the step of scoring the plurality of reduced size pattern recognition models includes the step of performing a likelihood scoring operation for each one of the reduced size pattern recognition models in said plurality of reduced size pattern recognition models.

4. The method of claim 1, further comprising the step of operating the computer system to perform the step of:

storing the set of reduced size models generated by performing step (i) in a buffer; and selecting, from the set of buffered models, as a function of scores generated by said scoring step, one of the plurality of reduced size pattern recognition models, to be used in a subsequent model size reduction operation.

5. The method of claim 4, further comprising the step of operating the computer system to perform the step of:

repeating steps (i) and (ii) using the selected reduced size pattern recognition model as the input pattern recognition model.

6. The method of claim 5, further comprising the step of operating the computer system to perform the step of:

determining, as a function of the scores generated by said scoring step, each time step (i) is performed, if preselected model size reduction stop criterion have been satisfied.

7. The method of claim 5, further comprising the step of:

eliminating the lowest scoring reduced size pattern recognition model from the buffer.

8. The method of claim 1, further comprising the step of operating the computer system to perform the steps of:

pruning from the set of reduced size pattern recognition models generated in step (i), reduced size pattern recognition models which are found, as a result of said scoring step, to be less likely to satisfy preselected criterion than the reduced size pattern recognition models which are not pruned; and repeating steps (i) and (ii) using at least one reduced size pattern recognition model which remains in the set of reduced size pattern recognition models, after the pruning step is performed, as an input pattern recognition model to step (i).

9. The method of claim 8, wherein said scoring step produces model scores; and wherein the pruning operation is performed so that the reduced size pattern recognition model having the highest score remains after the pruning operation is performed.

10. The method of claim 1, wherein step (i) of generating from the input pattern recognition model a set of reduced size models includes the step of:

performing a LaGrange multiplier operation to generate a plurality of different reduced size pattern recognition models from the input model, each of the generated plurality of reduced size pattern recognition models including a different number of model components.

11. A model training apparatus, comprising:

size reducing model training means for directly generating from a single input model having a first number of model components a plurality of reduced size models, the plurality of reduced size models including at least two models, each reduced size model including a number of model components which is fewer than said first number of model components, at least one reduced size model including two fewer components than the input model;

a scoring circuit coupled to the size reducing model training means for generating a score corresponding to each generated reduced size model;

a pruning circuit for eliminating from consideration at least one of the generated reduced size models; and feedback means for providing at least one of the remaining reduced size models as an input model to the size reducing model training means.

12. The model training apparatus of claim 11, wherein the size reducing model training means includes a LaGrange multiplier device.

13. The model training apparatus of claim 12, wherein the scoring circuit is a likelihood model scoring circuit.

14. The model training apparatus of claim 11, wherein said plurality of reduced size models includes at least two models, one of which has at least two fewer components than the input model.

15. The model training apparatus of claim 11, wherein said input model is a pattern recognition model.

16. The model training apparatus of claim 11, wherein said input model is a speech model.

17. The model training apparatus of claim 11, wherein said input model is an image model.

18. The model training apparatus of claim 11, wherein said input, pattern recognition model is a speech model.

19. The model training apparatus of claim 11, wherein said input pattern recognition model is an image model.

* * * * *